Jan. 13, 1959     R. E. ROTHFJELL     2,868,096
CAMERA FOR THE PHOTOGRAPHING OF OBJECTS
WITH KNOWN EXTENSION LENGTH
Filed April 24, 1952

INVENTOR:
Rolf E. Rothfjell
BY
ATTORNEYS

2,868,096

CAMERA FOR THE PHOTOGRAPHING OF OBJECTS WITH KNOWN EXTENSION LENGTH

Rolf E. Rothfjell, Stockholm, Sweden

Application April 24, 1952, Serial No. 284,046

1 Claim. (Cl. 95—11)

The present invention is in respect of a camera for the photographing of objects with known extension length.

According to the invention the camera is first of all characterised by at least one with the camera directly or indirectly attached rod being at the free end arranged and aimed at a spot known or alongside a part of the limited line of the field of image whereby the distance between said end and the camera corresponds to the desired distance between the camera and the object, when photographing takes place.

According to another development of the invention the camera is attached to a carrying organ, formed according to the position of the photographer's shoulder. Said carrying organ lies, according to a suitable shaping, in front of the camera at its lower part, at the same time as organs for carrying forth the film and the releasing of the shutter also are placed in front of the camera, and which are coupled to the camera by as such known transmission organs.

The invention is further explained in connection with the drawing, where—

Figure 1:
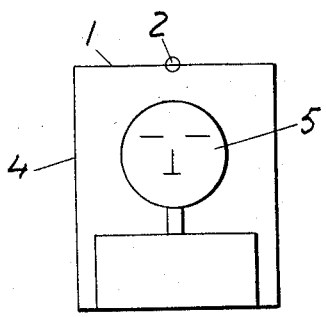
Fig. 1 shows an image field.
Figure 2:
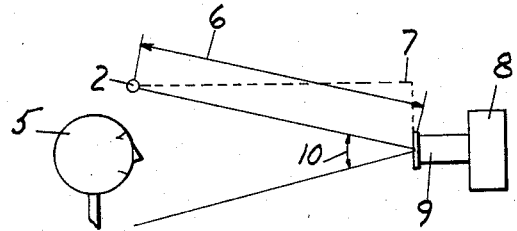
Fig. 2 shows the principle of the invention, schematically.

On Fig. 1 the horizontal sides of the image field are marked 1 and the vertical sides 2. The object with known extension length that is to be photographed, is marked 5. As schematically shown on Fig. 2 the camera 8, which is supplied with a lens 9, is focussed in such a way, that the free end 2 of a rod 7 attached to the camera and shown schematically, lies at the limited line of the field of image. According to Fig. 1 the spot corresponding to the free end 2 lies exactly over the object 5, but it is also possible to focus the camera so, that the spot 2 lies elsewhere, for instance in a corner of the image field. The free end of the rod 7 can be supplied with a transversal rod or the kind, covering a part of the limited line of the field of image. As shown on Fig. 2 it is only necessary to adjust the camera so that the free end 2 lies at the limited line of the field of image. It is easy for the photographer to make sure of this, because it is not difficult to ascertain and to judge when the spot 2 lies in the correct position as compared with the spot 5. The distance 6 between the spot 2 and the camera when photographing, corresponds to the distance desired betwen the camera and the object.

When the spot 2 is fixed correctly, the image angle 10 covers exactly the field of image desired.

Figure 3:
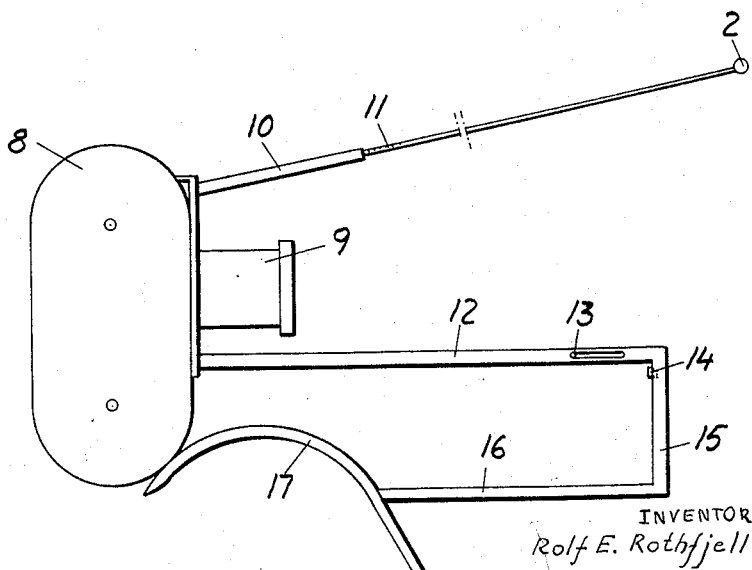
Fig. 3 shows a method of execution of a camera according to the invention.

According to Fig. 3 the camera 8 is connected with a carrying organ 17, which is shaped to be placed on the shoulder of the photographer, i. e. on the right shoulder in this case. The carrying organ 17 lies in front of the camera at its lower part and is connected with a rod or a tube 16, which has the shape of a handle in front, 15, the upper part of which is coupled to the camera by means of a tube 12. When the photographer places a camera with this arrangement over his shoulder, the camera lies somewhat at the back of the photographer's shoulder. The photographer then holds the handle 15 with his right hand and can easily with his thumb handle the organ 13 for the feed of the film and also an organ 14 for the release of the shutter. A rod consists of two parts 10 or 11, arranged telescopically, whereby the part 11 can be graded in order to correspond with the distance between the free end 2 and the camera, whose lens is marked 9 as before. This arrangement facilitates immensely the work of the photographer. He carries the camera easily over his shoulder, can focus the right image field and obtains at the same time the correct distance with great ease, also being able to manoeuvre the feed of the film and the release of the shutter by a simple grip of the hand. He needs only make sure that the camera is in the right vertical position, and this is easily done by constructing the carrying organ 17 in accordance with the slope of the shoulder of the photographer. The coupling between the organs 13 and 14 and the camera can for instance be a wire or the kind. As shown, the handle 15 forms together with the rod 16 and the tube 12 a U-shaped frame-part, where the tube 12 can contain the said wire of the kind.

According to the invention the camera can obviously have variable construction within the scope of the invention.

I claim:

A finder and a shoulder support in combination with a camera, the shoulder support comprising a carrying organ shaped to the shoulder of the photographer, means for securing one end of said organ to the bottom of the camera with the free end extended forwardly thereof, a U-shaped frame for the camera and carrying organ, means for securing one end of said frame to said organ and the opposite end to the front of the camera, said organ and frame being outside the field of image; the finder comprising a telescopic rod disposed on the front of the camera adjacent the top and extended forwardly thereof, said rod being along the line of the field of image when said carrying organ maintains the camera in correct vertical position.

References Cited in the file of this patent

UNITED STATES PATENTS

| | | |
|---|---|---|
| 2,140,050 | Hart | Dec. 13, 1938 |
| 2,241,300 | Gale | May 6, 1941 |
| 2,370,611 | Du Mais | Feb. 27, 1945 |
| 2,403,892 | McFarlane et al. | July 9, 1946 |
| 2,466,171 | Hencke et al. | Apr. 5, 1949 |
| 2,483,711 | Roos | Oct. 4, 1949 |
| 2,537,303 | Cobb et al. | Jan. 9, 1951 |